Jan. 30, 1973 | J. R. SYKES | 3,714,382

METHOD AND SYSTEM FOR BIOIRECTIONAL SEARCH AND POSITIONING MAGNETIC RECORDING TAPE USING A REEL TURN SENSOR CONTROLLED COARSE POSITIONING

Filed Dec. 2, 1970 | 4 Sheets-Sheet 1

INVENTOR
John R. Sykes
BY
Pennie, Edmonds, Morton, Taylor & Adams
ATTORNEYS

INVENTOR
John R. Sykes
BY Pennie, Edmonds, Morton, Taylor & Adams
ATTORNEYS

Jan. 30, 1973 J. R. SYKES 3,714,382

METHOD AND SYSTEM FOR BIOIRECTIONAL SEARCH AND POSITIONING MAGNETIC RECORDING TAPE USING A REEL TURN SENSOR CONTROLLED COARSE POSITIONING

Filed Dec. 2, 1970 4 Sheets-Sheet 3

INVENTOR.
JOHN R. SYKES

BY

[signature]

HIS ATTORNEY

INVENTOR.
JOHN R. SYKES
BY
[signature]
HIS ATTORNEY 3,714,382

METHOD AND SYSTEM FOR BIDIRECTIONAL SEARCH AND POSITIONING MAGNETIC RECORDING TAPE USING A REEL TURN SENSOR CONTROLLED COARSE POSITIONING

John R. Sykes, Rochester, N.Y., assignor to Sykes Datatronics, Inc., Rochester, N.Y.

Continuation-in-part of abandoned application Ser. No. 2,833, Jan. 14, 1970. This application Dec. 2, 1970, Ser. No. 94,407
Int. Cl. G11b *27/18, 15/18*
U.S. Cl. 179—100.2 S 16 Claims

ABSTRACT OF THE DISCLOSURE

Magnetic recording tape is quickly and accurately positioned at a selected location by the use of a turn counter to permit high speed advancement or rewinding of the tape to the vicinity of the desired location and the use of an address signal on the tape to indicate the exact location. A specific embodiment is described which uses a turn counter attached directly to either the supply or the take-up spindle in order to avoid cumulative error and to permit operation without the necessity of returning the tape to an initial reference position.

BACKGROUND OF THE INVENTION

The present invention relates to a system and a method for storing and retrieving information on magnetic tape. The system and method are especially designed for rapid and efficient location of selected information in large capacity systems. This application is a continuation-in-part of my application Ser. No. 2,833, filed Jan. 14, 1970 now abandoned.

Systems capable of storing and selectively retrieving large quantities of information stored on magnetic tape are now used in a wide variety of applications. These systems typically comprise lengths of magnetic recording tape stored on reels or in cassettes, a tape transport unit for advancing or rewinding the tape past a read/write head and tape positioning means for engaging the tape with the head where the desired information is located. Such systems are utilized, for example, to store speech, music, television programs, account records for computerized billing and even computer programs.

There are basically two types of prior art tape positioning methods, neither of which is particularly efficient for use in large capacity systems. A first type keeps track of the amount of tape unwound from a reel. This task is typically accomplished by indirectly attaching a turn counter (similar to an odometer) to one of the tape reels by means of a belt. Experience has shown that the accuracy of this type of positioning mechanism is limited due to belt slippage and that in order to avoid cumulative errors the tape must be returned to a reference position. The second type utilizes address signals disposed upon the tape itself, and the tape is wound or unwound until the desired address is read.

While these positioning methods are adequate for low capacity systems, they present difficulties in systems utilizing hundreds of feet of tape per reel. For example, in such systems the counter-type positioning mechanisms typically introduce positioning errors on the order of inches. These errors are significant because of the large number of bits per inch (typically about 1,000) stored on such tape. In addition, the necessity of returning a long length of tape to a reference position is unnecessarily time consuming. On the other hand, the address-type mechanisms, while more accurate than the counter-type mechanisms, are usually much slower because of the necessity of reading the addresses without damaging or prematurely wearing out the tape.

OBJECTS OF THE INVENTION

It is principal object of the invention to provide a magnetic tape unit for reading and writing data characters suitable for use in connection with computers and other data processing apparatus in which the tape is contained in miniature cassettes and the entire unit is miniature (e.g., of a size comparable to the so-called mini-computers).

It is a further object of the invention to provide a magnetic tape unit for handling data characters which is capable of rapid and bidirectional access to any desired item on a long magnetic tape (viz a tape contained in a cassette) which item may be selected at random and without any need in the unit for complex and physically large devices, such as tension arms and vacuum columns, heretofore needed to enable such rapid access.

It is a still further object of the invention to provide a magnetic tape unit for storage or retrieval of data characters which has the features set forth in the foregoing objects and has reliability and error performance not heretofore obtainable in a miniaturized system of comparable data storage capacity.

SUMMARY OF THE INVENTION

In accordance with the present invention, magnetic recording tape is quickly and accurately positioned at a selected location by the use of a sensor which senses reel turns to permit high speed advancement or rewinding of the tape to the vicinity of the desired location and the use of an address signal on the tape to indicate the exact location. In a preferred embodiment the sensor is a shaft encoder attached directly to either the supply or the take-up spindle in order to avoid cumulative error and to permit operation without the necessity of returning the tape to an initial reference position.

BRIEF DESCRIPTION OF THE DRAWINGS

The advantages, nature and features of the present invention will appear more fully upon consideration of the illustrative embodiments now to be described in detail in connection with the accompanying drawings in which.

DETAILED DESCRIPTION

Figure 1:
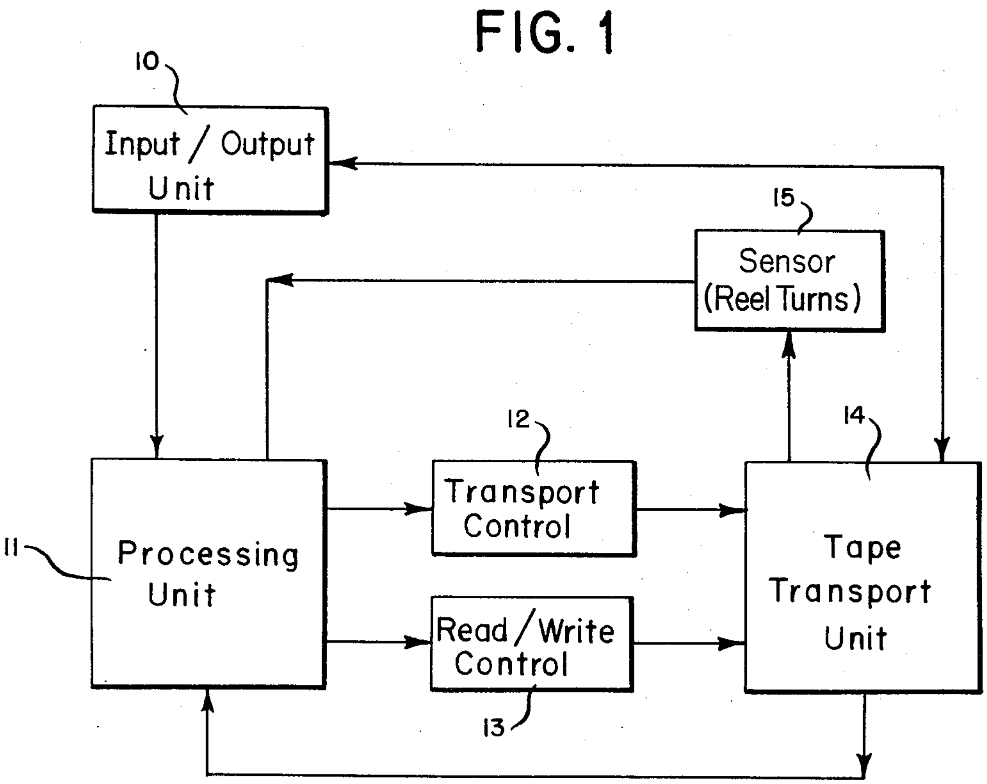
FIG. 1 is a schematic block diagram of a typical information storage and retrieval system in accordance with the invention.

Referring to the drawings, FIG. 1 schematically illustrates a magnetic tape information system comprising an input/output unit 10 electrically connected to a processing unit 11, which in turn, is connected to the transport control 12 and the read/write control 13 of a tape transport unit 14. A reel turn sensor 15 is connected between the transport unit and the processor for feeding into the processor information about movement of the transport unit, and the transport unit is connected to the input/ouput unit for reading from and writing on tape.

Tape transport unit 14 is a device well-known in the art for moving a magnetic tape—usually stored on reels or in cassettes—past a small electromagnet (called a read/write head) used for reading, recording or erasing polarized spots on the tape that represent information. It typically comprises a pair of spindle shafts (referred to as the supply and take-up spindles) rotatable by one or more motors. The spindles, motors and read/write head are typically mounted on a rigid deck casting.

In a cassette unit embodying the invention, when a cassette is loaded into the transport unit 14, the supply and take-up spindles respectively engage the supply and take-up hubs of the cassette. The tape is wound around these hubs and extends across the front edge of the cassette which has openings to present the tape to the heads and pinch roller assembly of the transport unit 14. As will be explained more fully hereinafter in connection with FIG. 4, the heads are positioned to read and write on two side-by-side tracks which extend longitudinally along the tape; namely Track A which serves as an address track and Track B which serves as a data track.

Transport control 12 is a unit for controlling the movement of tape in transport unit 14 in response to signals from processor 11. It preferably comprises one or more switches for controlling the motors turning the spindles. In a preferred embodiment it is capable of switching the motors among the fast forward, fast reverse, normal forward and stop conditions. The fast forward and fast reverse conditions involve speeds much higher than reading speeds.

Figure 2:
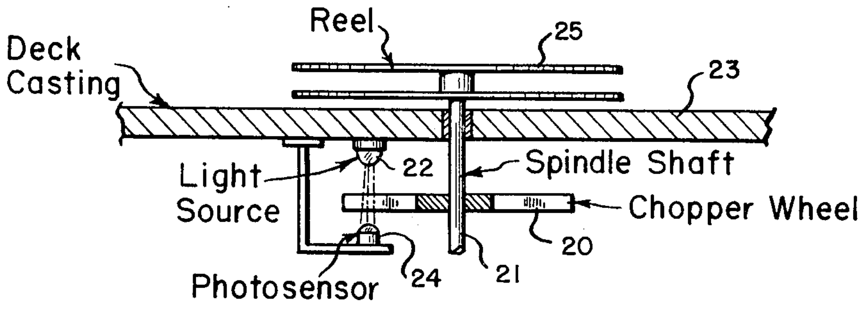
FIG. 2 is a schematic cross section of an improved sensor for use in the system of the invention.

The reel turn sensor 15 is a device for generating an electrical signal in response to motion of the tape transport unit. It is typically a device for measuring the amount of rotation of either the supply spindle or the take-up spindle. While prior art turn counters were typically indirectly attached to the spindle by a belt, it has been found that cumulative error can be substantially eliminated by using a reel turn sensor comprising a shaft encoder—of either the absolute type or of the incremental type—attached directly to the spindle. FIG. 2 illustrates a preferred embodiment of such a sensor comprising a chopper wheel 20 concentrically mounted on one of the spindle shafts 21, a light source 22 mounted on the deck casting 23 and a photosensor 24 (also mounted on the deck casting) for receiving the light beam. When the spindle rotates, the fins of the chopper wheel interrupt the light path between the source and the sensor, thus generating electrical pulses. These pulses are fed into the processor which uses them to determine the absolute shaft angle. Alternatively, an encoder can be directly connected to a spindle by use of a commutator disk or by use of a reed-switch actuated by magnets mounted on the shaft. The advantage of the direct attachment is the avoidance of cumulative error due to belt slippage.

Preferably the chopper wheel has several (e.g. five) equally spaced vanes. During each spindle rotation (360°), the vanes interrupt the light beam which is incident upon the photosensor 24. Since several, say five, photosensor output signals are generated per rotation, the tape position can be ascertained to a high degree of resolution. As will be explained more fully hereinafter in connection with FIGS. 4 and 5 the tape contains numerous tape addresses which are located in successive segments or intervals along the tape (e.g. 7299 tape addresses on a 300 foot length of tape). It is a feature of this invention to provide a relationship between the tape addresses and the spindle shaft encoding system to provide for direct access to any desired address which may be selected at random, such access being obtained with utmost rapidity at high forward speed or high reverse speed (viz, bidirectional search). The search speed may for example be 120 inches per second (i.p.s.) as compared to a read/write speed of 5 inches per second. As the description proceeds an ancillary feature of the invention of providing dual speed search to locating a desired tape address will become more apparent. In accordance with this dual speed search feature the high speed bidirectional search is first utilized, wherein the tape is driven at high speed (to 120 i.p.s.) solely by the spindles which connect to the cassette hubs and the heads and pinch roller/capstan assembly are retracted from the tape. Then, normal read/write speed is utilized and the heads and pinch roller/capstan assembly are extended to the tape so that the prerecorded tape addresses can be read and verified until the desired address is found. The dual speed feature eliminates tension arms and/or vacuum columns usually found in tape units having high accessing speeds and enables the use of miniature tape cassettes for electronic data processing applications. Miniature tape stations compatible in size with mini-computers but having large data storage capacities are therefore made possible by this invention.

Returning now to the relationship between the tape addresses and the spindle shaft encoding system, as the take-up reel 25 turns (see FIG. 2) the vanes in the chopper wheel 20 interrupt the light beam from the light source 22 to generate output signals which may be suitably conditioned into pulses of short duration, as compared to the duration of a tape address interval (e.g. by amplification and shaper circuits). These signals are termed "change tape addressed or CTA signals. Assume that five CTA signals are generated per rotation (360°) of the spindle shaft, the distance between the tape addresses, i.e., the lengths of the tape address intervals—see FIG. 4—is such that the tape addresses each correspond to a different one-fifth (72°) rotation of the spindle shaft. In other words, the distance between the pre-recorded tape adddresses is such that a tape address passes beneath the head (retracted of course in high speed search) as each CTA signal is generated by the spindle shaft encoding system.

Read/write control 13 is a device for engaging or disengaging the read/write head with the tape passing between the supply and take-up spindles. When the head is disengaged (by, for example, a solenoid) the tape can be transported at fast forward and fast reverse speeds (typically greater than 100 inches per second). When the head is engaged the tape is transported at its normal forward speed (about 5 inches per second) and the reading or writing can take place. The control is capable of switching the head among the read, write and off conditions in response to commands from the processor.

Input/output unit 10 is for entering information into the system or retrieving it. This unit actuates the routines stored in the processor for accessing to a selected address on tape in the transport unit. It may be a conventional input/output terminal or even a computer directly connected to the system.

Processing unit 11 is a binary arithmetic processing unit, such as a conventional "mini"-computer, having sufficient memory and systems programming to coordinate the activities of the above-described components. Upon receiving a request from the input/output unit to read or write at a particular address on magnetic tape placed in the transport unit, the processor compares the present address of the tape with the requested address and computes the tape motion (e.g., the number of reel rotations) required to reach the vicinity of the requested address. It then commands the transport control unit to effectuate this computed transport at either high forward speed or high reverse speed, whichever will reach the desired position faster. The processor monitors the position of the tape through the reel turn sensor; and, when the tape reaches the desired position, it commands the transport to slow the tape down to normal forward reading speed. At the same time it commands the read/write control to engage the head and read addresses formatted on the tape until it detects the requested address. Once the address is detected, the processor commands the read/write control to either read the information stored at that address or to write at that address. In a preferred embodiment, the record address and the record information are stored on separate tracks on the tape. For convenience, the spacing between adjacent addresses may be gradually reduced so that a single rotation of the reel results in a movement of the same number of addresses regardless of how much tape is left on the reel.

It will be noted that this system obtains high speed for two reasons. First because the tape need not be read in the initial positioning step high speed can be used. Second, because cumulative errors are avoided in the turn counter, the system need not start from a particular reference position, but rather can go forwards or backwards from its final position in the preceding use.

The system obtains high accuracy because final positioning is from a formatted address on the tape itself.

Figure 3:
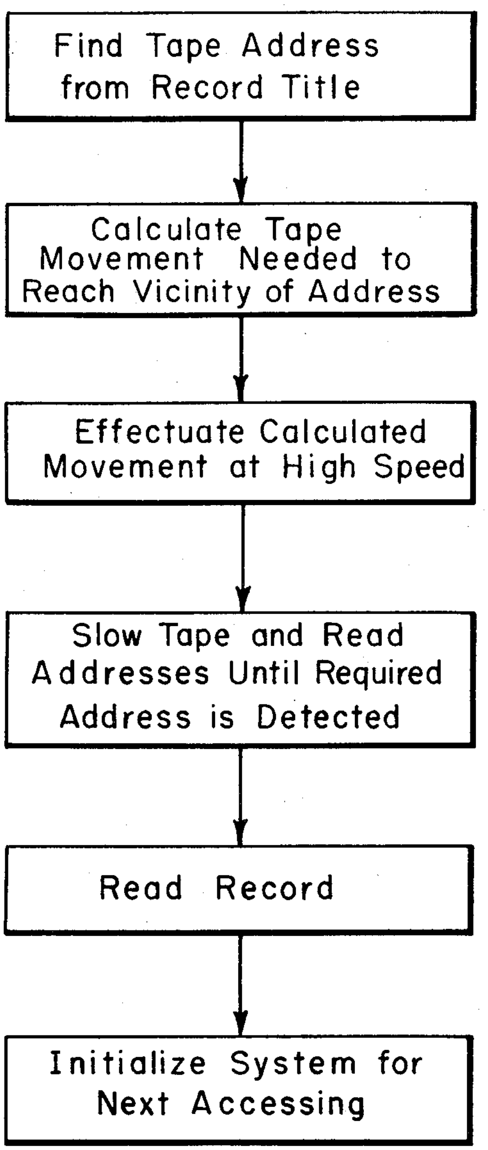
FIG. 3 is a schematic flow diagram showing the steps of a typical method for retrieving information in accordance with the invention.

FIG. 3 illustrates, in greater detail, a flow diagram of the steps involved in accessing a requested record in accordance with the invention.

As can be seen from the diagram, the first step involves electronically finding the tape address of the requested record. This is accomplished in the processor by a simple "Dictionary" program. (As each record is entered onto the tape, its "title" and address are recorded in the processor's memory. When the titled record is requested, the processor simply consults the memory to determine the address of the record.) This step can, of course, be eliminated if the record is called for by its address.

The second step involves electronically computing the tape motion required to reach the vicinity of the address. This is accomplished by the processor with the aid of a "Calculating" program. The processor is programmed to compare the present address of the tape with the required address and then compute the number of reel turns required to reach a position sufficiently in front of the desired address that there is no significant probability of over-shooting the required address.

In the next step the tape transport is electronically actuated to advance or rewind at high speed until the number of reel turns agrees with the number thereof as computed. The processor effectuates this step by commands to the transport control and by monitoring the signals from the turn counter.

The tape is then electronically read until the address of the requested record is detected. This step involves commands from the processor to stop the tape, advance at reading speed and to engage the reading head to read the address track.

When the required address is detected, the information is electronically read out to the input/output unit. When the input/output unit is a computer, this step is conveniently accomplished by transferring the information to an intermediary memory buffer before it is subsequently transferred into the computer.

After the record is read, the system is initialized for the next accessing. This step involves reading the next address on the addressing track, storing the address in the memory of the processor and disengaging the reading head.

Figure 4:
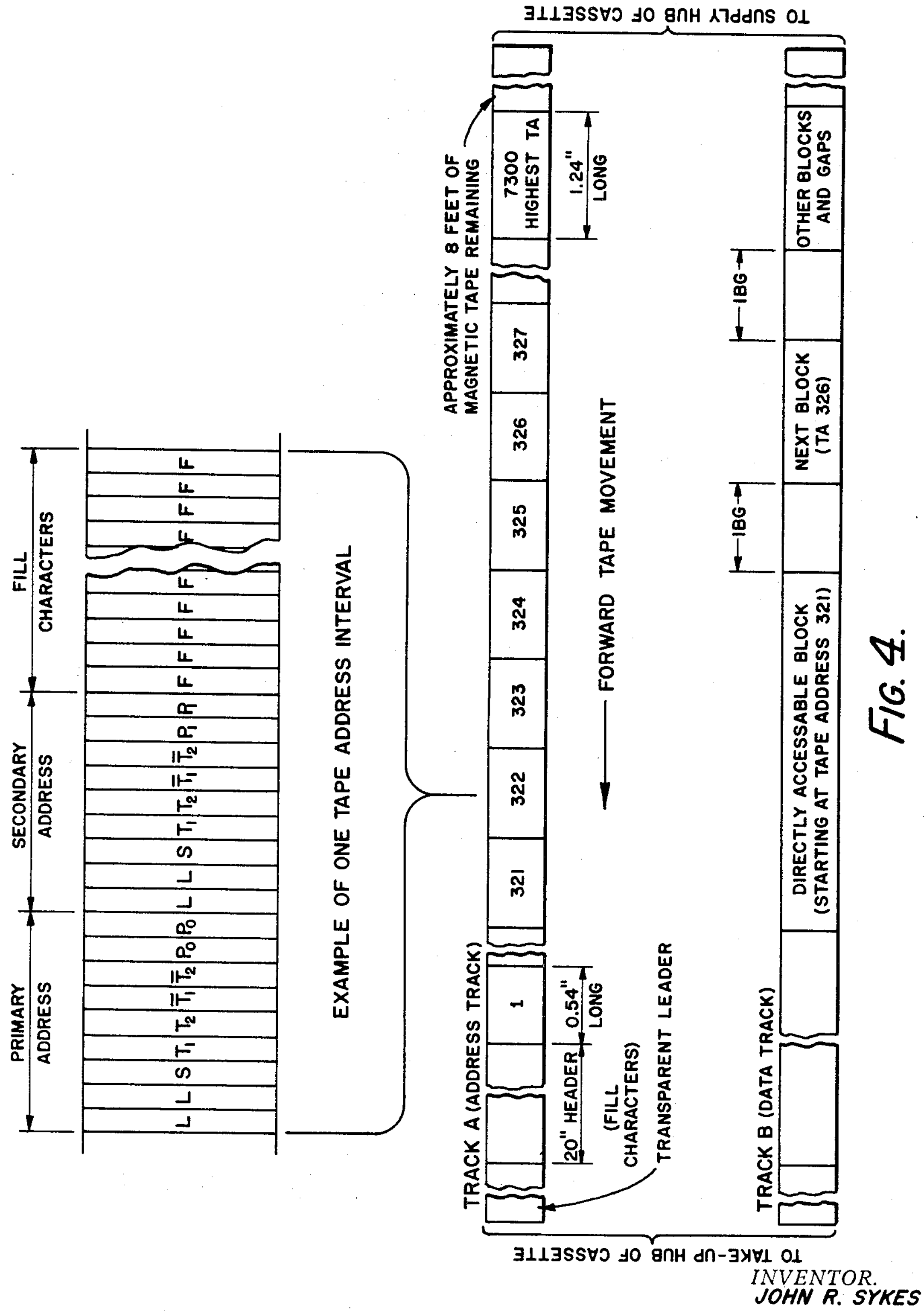
FIG. 4 is a diagrammatic view of magnetic tape of the type which is wound upon the supply and take-up hubs of a cassette, but extended to show the address and data tracks thereon and the format of the data recorded on both of these tracks.
Figure 5:
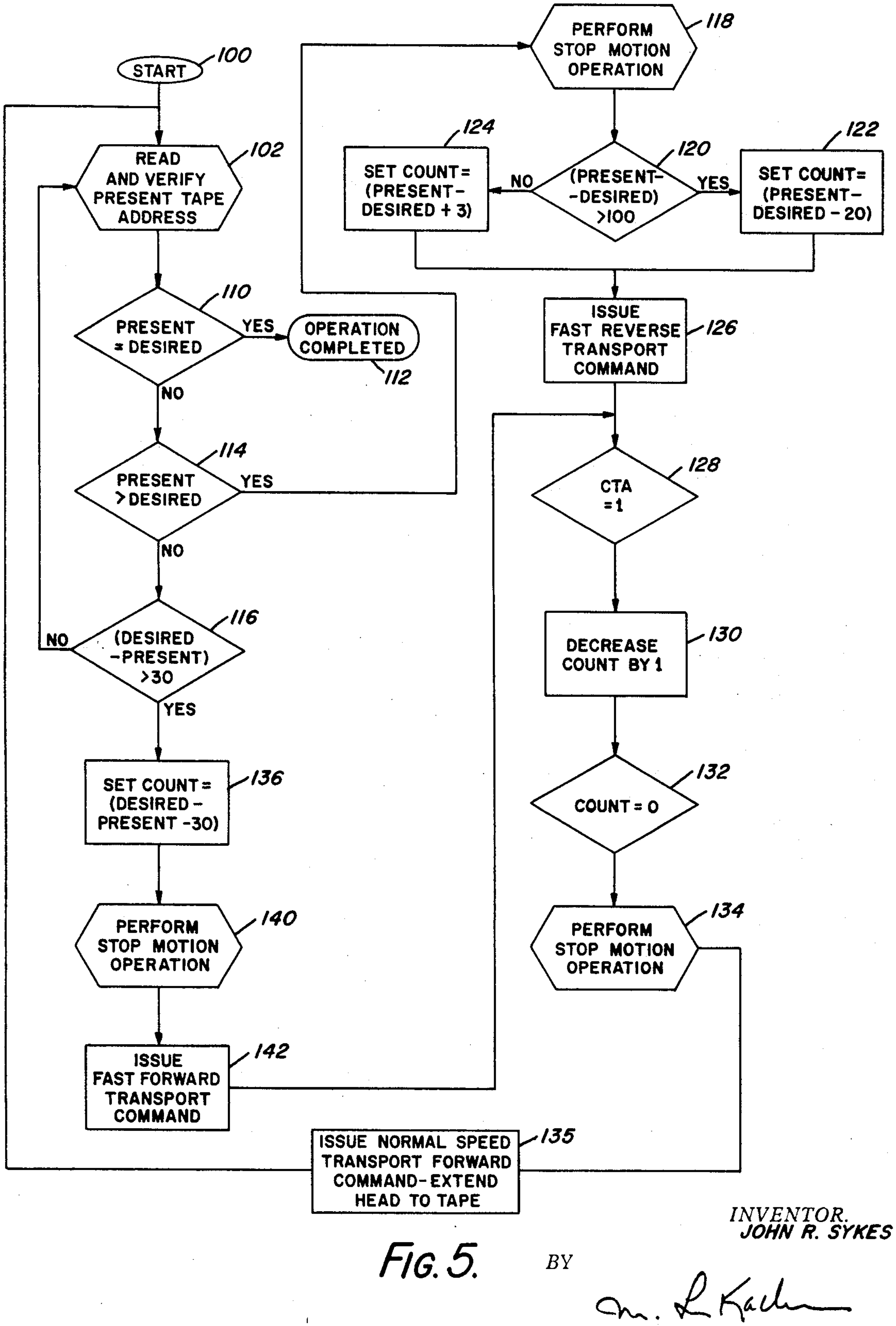
FIG. 5 is a flow chart illustrating the operation of the magnetic tape unit in rapidly searching for and finding a data item at a desired address by providing bidirectional direct access to any such desired address.

The high speed bidirectional search features of the invention will become more apparent from FIGS. 4 and 5. As shown in FIG. 4 the magnetic tape, which may be 300 feet long, has transparent sections at both ends (viz, the take-up hub end and the supply hub end) which provide for end-of-tape sensing in the tape transport unit 14.The tape has two tracks A and B. Track A is the address track and has prerecorded binary tape address characters. Track B is the data track wherein data characters are written in blocks. The blocks may be chained (viz, written without stopping the tape) or sequential. In the latter case, interblock gaps (I.B.G.) result. The address track in the illustrated example has 7299 (viz, 1 to 7300) tape addresses, each in a successive tape address interval. In recording the tape address intervals, control signals are provided by the CTA signals produced by the spindle shaft encoding system. (See FIG. 2.) One tape address interval is produced between each successive pair of CTA signals; specifically between the leading edge or other suitable like points during the rise or fall times of successive CTA pulses. Thus the sequential tape address intervals occur at a rate corresponding with the rate of the CTA signals generated by the spindle encoding system. Inasmuch as the amount of tape wound upon the take-up hub increases as the tape moves in the forward direction (viz, from the supply to the take-up hub) the first or number 1 of the 7300 tape address intervals, which is the first to be wound upon the take-up hub, is the smallest and the tape address intervals increase gradually in size.

The sizes of the first (No. 1) and last (No. 7300) invervals indicated in FIG. 4 are typical for 300 feet of tape wound in a miniature cassette (e.g., 4" x 2½" x ⅜").

Each tape address interval consists of two subsets of characters, namely a primary address and a secondary address. Fill characters are recorded between the spare characters at the end of the secondary address and the first character of the next tape address interval. The primary and secondary addresses enable the use of a verification of search and thus greater reliability. The characters of the addresses are in an eight bit binary code positioned as shown in FIG. 4 and identified in the following table:

| Symbol | Identification | Code |
|---|---|---|
| L | Leader character | (01010101). |
| S | Sync character | (01110111). |
| $T_1$, $T_2$ | Tape addresses | Two eight bit characters joined to form 16 bit value for 1 to 7300. |
| $\overline{T}_1$, $\overline{T}_2$ | Two's complement of $T_1$, $T_2$ | (same as above) |
| $P_0$ | Spare character "0" | (00000000). |
| $P_1$ | Spare character "1" | (00000001): |
| F | Fill character | (00000000). |

Because of the synchronization between the tape addresses as prerecorded on address Track A and the output of the spindle shaft encoder (the CTA signals), the magnetic tape unit has high speed, bi-direction access to any address. Thus, high speed access is provided to adjacent data blocks on Data Track B. These data blocks can occupy more than one address interval. By way of example, FIG. 4 shows one data block starting at address 321 and extending to address 324. The next sequential data block starts at tape address (TA) 326 and ends in TA 327. Other data blocks precede and follow the blocks starting at TA 321 and TA 326, in the illustrative example shown in FIG. 4. Each data block, however, is directly accessible via high speed bi-directional search with heads and pinch roller retracted from the tape, followed by normal forward speed search while reading the address track.

The components and logic in I/O unit 10, processing unit 11 and spindle shaft encoder (which includes the sensor 15) are of the type which are generally available in the electronic data processing art. They are combined, organized and their method of their operation is in accordance with the invention to utilize the synchronization and relationships of tape addresses and spindle shaft encoder output discussed above to provide the dual speed search features of the invention. This combination, organization and method will be more fully understood from FIG. 5.

At the start 100 of an address search operation the address track is read and verified 102 and the verified address is stored in the memory or accumulator of the processing unit as the present address which is beneath the read/write head at the outset. As indicated above, this step may be done by initializing the system after the previous block of data has been accessed and utilized (viz, on completion of the previous read/write operation).

The I/O unit 10 or the program in the processing unit 11, then inputs the next desired address. The processing unit performs a compare operation. If the present address is the same as and equals the desired address 110, the search is completed 112.

Inasmuch as the tracks are to be read with forward tape movement the system has the means to issue a fast reverse command to the transport unit 14 in any event where the present address is greater than the desired address 114 (i.e., the desired address is on the left of the present address as shown in FIG. 4).

A fast forward command is issued if the desired address is more than thirty addresses away from the present address (i.e., desired address-present address is greater than thirty (116)).

If the difference is less than thirty, it is not practical to use high speed movement. Therefore the heads remain extended to the tape and the reading verification 102 of each address at read/write speed continues until the desired address is read and the present address equals the desired address (100 and 112).

The address is read and verified in the processing unit 11 as follows: the address characters $T_1$ and $T_2$ in the primary address and their complements $\overline{T}_1$, and $\overline{T}_2$ are chained (concatenated) to form the 16-bit address word and its complement. The address word and its complement are added to verify a correct address. If the result is zero, the address is verified. If the result is not zero an error exists and the characters $T_1$ ,$T_2$ and $\overline{T}_1$, $\overline{T}_2$ in the secondary address are read and verified. If again an error exists, the next sequential tape address interval is read. If a predetermined number of errors result an alarm indication is produced.

Consider that the present address is a higher number than the desired address, the transport unit is commanded to perform a stop motion of operation. The tape then stops and the heads and pinch roller assembly retract, while the processor makes the necessary calculations. A reverse drive is called for. The length of tape-travel in the reverse direction is established by setting a counter. If the travel is long, as determined by the difference between the present and desired addresses being greater than one hundred (120), the count is set equal to the difference minus twenty (122). Accordingly, the additional time to stop after a long run at fast reverse speed is accommodated, and the tape will come to a stop with the desired address to the right (as shown in FIG. 4) of the head so that the addresses can be properly read during normal speed forward tape movement.

Should the difference between the present and desired addresses be less than one hundred, only a shorter travel in the reverse direction is needed. Then the counter is set to the difference plus three (124) to insure that the tape will stop with the desired address to the right of the head after the short run at fast reverse speed.

After the counter is set the processor 11 conditions the transport control 12 to issue a fast reverse command (126). The spindle shaft encoder CTA signals are produced (viz, CTA=1) (128). These signals each decrement the counter by one (130). When the count equals zero (132), the processor 11 issues the necessary command signals so that the transport control 12 causes the transport to stop the fast reverse run (134).

After the tape comes to a stop the transport unit 14 flags the processor which thereupon issues the necessary commands for normal speed read/write operations. The heads and pinch rollers are extended to the tape (135). The address track is read and verified (102) until the desired address is read (110). The search operation is then completed (112).

Fast forward drive obtains when the difference between the desired and present addresses exceeds thirty. The counter is set to that difference minus thirty (136). The tape is stopped either before the counter is set or afterwards as indicated at (140). A fast forward command is issued. The CTA signals are used to decrement the counter and the operations 128, 130, 132, 134, 135, 102, 110, 112 performed, as explained above. Since the fast forward travel is commanded to stop thirty addresses ahead of the desired address, a short run at normal reading speed locates the desired address.

After the address is accessed, forward motion continues and the unit performs read/write operations on the data Track B. Leader characters in the data track block assure that no data is lost during the transition from the address to data track.

In all cases it is understood that the above described methods and systems are only illustrative of the many possible specific embodiments which can represent application of the principles of the invention. Numerous and varied other arrangements can be readily devised in accordance with these principles by those skilled in the art without departing from the spirit and scope of the invention.

What is claimed is:

1. A system for positioning magnetic recording tape at a preselected address of a plurality of addresses formatted on said tape at successive spacings which change in length progressively from one end of said tape to the other, said system comprising:

a processing unit;

a tape transport unit for tape movable between reel devices on which said tape is wound, and having means for moving said tape between said reel devices and past a read/write head included in said transport unit;

transport control means for actuating said transport unit and switching it among the high forward speed, high reverse speed, normal forward speed and stop conditions in response to tape control signals from said processing unit;

read/write control means for engaging and disengaging said read/write head with said tape and for switching said head among the read, write and off conditions, all in response to head control signals from said processing unit;

a sensor for sensing the rotation of at least one of said reel devices and for generating electrical signals in response to rotation of said one reel device as the tape is wound on or unwound from said one reel device, said address spacings being such that the same number of said sensor generated signals corresponds to the same number of addresses irrespective of the amount of tape wound on said one reel device, and means for relaying said signals to said processing unit;

said processing unit (a) including means for receiving requests to position said tape at said preselected address, (b) means for calculating in terms of said sensor generated signals the tape movement required to transport said tape to the vicinity of said preselected address, (c) means for providing said tape control and head control signals to said transport control means and to said read/write control means, respectively, for transporting said tape at high reverse or high forward speed with said head disengaged from said tape until said sensor generated signals indicate said calculated movement has been effected whereby to position said tape so that said preselected address is in the vicinity of said head, and (d) means for providing said tape control signals to said transport control means to finally position said tape so that said preselected address is positioned at said head by providing said tape control signals to said transport control means to transport said tape at normal speed and by providing said head control signals to said read/write control means to engage said read/write head with said tape and to read the addresses formatted on said tape until said requested address is detected.

2. A system according to claim 1 wherein said tape transport unit includes reel devices having spindles for winding or unwinding reels of said tape and said sensor is directly attached to one of said spindles.

3. A system according to claim 2 wherein:

said tape transport unit includes a deck for mounting the components thereof;

and said sensor comprises a light source for generating a beam of light mounted on said deck, a photosensor mounted on said deck to receive light from said source, and a chopper wheel concentrically mounted on said spindle for interrupting the light path between said source and said photosensor when said spindle rotates whereby to produce said sensor signals which are relayed to said processing unit upon each interruption of said light path.

4. A method for automatically positioning magnetic recording tape which is reeled from or onto a reel device as it rotates at a preselected address of a plurality of addresses formatted on said tape at successive spacings which change in length progressively from one end of said tape to the other, said spacings being such that each rotation of the reel device corresponds to the same number of addresses irrespective of the amount of tape wound on said reel device, said method comprising the steps of:

electronically calculating in terms of reel device rotations the tape movements required to reach the vicinity of said address;

electronically counting rotations of said reel device;

electronically effectuating said calculated movement at either high forward speed or high reverse speed, whichever direction is nearer while counting said reel device rotations and without reading said tape addresses; and electronically slowing said tape motion to normal reading speed and reading the addresses formatted on said tape until said preselected address is recognized.

5. The invention as set forth in claim 4 including the step of formatting said addresses in a succession of address intervals of increasing length related to the arc subtended by each said interval when wound on a take-up spindle, and each of said intervals with a character successively higher number written therein.

6. The method according to claim 4 wherein:

said required tape movement is calculated by comparing the present address of the tape with said preseelcted address and calculating in a processing unit the number of reel turns required to reach a position sufficiently in front of the desired address that there is no significant probability of overshooting said address; and said calculated movement is effectuated by said processing unit commanding said high speed motion until the number of reel turns agrees with the number calculated.

7. The method according to claim 6 including the final step of initializing the system utilized by electronically reading the next address on the tape and storing this address in the memory of the processing unit.

8. A system for positioning magnetic recording tape at a preselected position of a plurality of positions located successively in predetermined spaced relationship, along said tape in response to commands from a processing unit having means for converting input signals thereto into and issuing said commands, said system comprising:

tape transport unit means for moving said tape between reel devices past a head included in said tape transport unit means;

transport control means for actuating said tape transport unit and switching it among the high forward speed, high reverse speed, normal speed and stop conditions in response to transport commands from said processing unit;

head control means for engaging and disengaging said head with said tape in response to head commands from said processing units; and sensor means responsive to the rotation of at least one of said reel devices for generating electrical signals when said one reel device turns, said positions being spaced such that the same number of said sensor generated signals corresponds to the same number of said positions irrespective of the amount of tape wound on said one reel device, means for relaying said sensor signals to said processing unit; said processing unit including means responsive to said input signal for calculating in terms of rotations of said one reel device the tape movement required to reach said preselected position and for issuing a transport command to said transport control means and a head command to said head control means to effect high speed conditions with disengagement of said head, said processing unit also including means responsive to said sensor signals for issuing another transport command to said transport control means and another head command to said head control means for effecting normal speed conditions with engagement of said head when said certain number of said sensor signals is recognized, said processing unit also including means responsive to signals from said head for issuing a transport command to said transport control means to effect said stop condition when said tape reaches said preselected position.

9. The invention as set forth in claim 8 wherein said tape includes an address track having a plurality of tape intervals each having a length corresponding to the travel of said tape past said head between the occurrence of successive ones of said sensor signals.

10. A system according to claim 8 wherein said tape transport unit means includes reel devices having spindles for winding or unwinding reels of said tape and said sensor means is directly attached to one of said spindles.

11. A system according to claim 10 wherein said tape transport unit means includes a deck for mounting the components thereof;

and said sensor means comprises a light source for generating a beam of light mounted on said deck casting, a photosensor mounted on said deck to receive light from said source, and a chopper wheel concentrically mounted on said spindle for interrupting the light path between said source and said photosensor when said spindle rotates.

12. A system for positioning a magnetic tape having an address track having a plurality of address intervals and also having a data track for successive blocks of data adjacent to address intervals on said address track which correspond thereto, said address intervals progressively increasing in length from one end of said tape to the other, said system comprising:

(a) a transport unit including a take-up spindle means and supply spindle means for reeling said tape from said supply to said take-up spindle means in opposite directions at fast speed and in at least the direction from said supply to said take-up spindle means at slow speed for read/write operations on said tape, (b) encoding means included in one of said spindle means for providing change tape address signals upon rotation of said one spindle means and in synchronism with the movement of said address intervals on said tape past a predetermined point in its path of travel from said supply to said take-up spindle means, the spacing between successive address intervals being such that the same number of address intervals pass said given point for each rotation of said one spindle means irrespective of the amount of tape wound thereon, (c) means for controlling said transport unit to position said tape at a preselected address interval including (1) means for determining the number of said change tape address signals to reach the vicinity of said preselected address intervals, (2) means for providing high speed bidirectional search along said tape path until said number of said change tape address signals is recognized, and (3) means for providing slow speed search and read operation until said preselected address interval is recognized.

13. The invention as set forth in claim 12 wherein a magnetic read/write head is disposed at said predetermined point.

14. The invention as set forth in claim 12 wherein (a) said tape address intervals are sequentially disposed from said take-up to said supply spindle means and said intervals have separate address characters prerecorded therein which represent successively high numbers in sequence, and, wherein (b) means are provided for reading said address characters prior to said high speed bi-directional search for controlling the direction of said search.

15. The invention as set forth in claim 14 including (a) means included in said high speed search controlling means operative subsequent to high speed search for conditioning said transport unit to drive said tape at said slow speed and for reading said address track, and (b) means responsive to the characters read from said address track for enabling read/write operations on said data track when the number represented by one of said address track characters equals the number of a desired address.

16. The invention as set forth in claim 14 wherein said address track intervals each have recorded therein a plurality of binary coded characters representing the address number of each said interval and the complements thereof, and means included in said reading means responsive to said address characters and their complements for verifying said tape addresses.

References Cited

UNITED STATES PATENTS

| | | | |
|---|---|---|---|
| 3,541,271 | 11/1970 | Joslow et al. | 340—174.1 C |
| 3,579,195 | 5/1971 | Hallmark et al. | 340—174.1 C |
| 3,409,239 | 11/1968 | Siebert | 179—100.2 S |
| 2,944,750 | 7/1960 | Hall | 235—103 |
| 3,279,799 | 10/1966 | Proctor | 179—100.2 MD |
| 2,756,279 | 7/1956 | Lang | 235—103 |

OTHER REFERENCES

Bradley, "Direct Access Tape Control System," I.B.M. Tech. Disc. Bull., vol. 10, No. 1, June 1967, p. 17.

Halfmill et al., "Track Accessing Servo System," I.B.M. Tech. Disc. Bull., vol. 9, No. 12, May 1967, p. 1694.

BERNARD KONICK, Primary Examiner

R. S. TUPPER, Assistant Examiner

U.S. Cl. X.R.

340—174.1 C